Feb. 1, 1955   L. N. VIGUM ET AL   2,700,859
GRAIN CUTTING AND WINDROWING APPARATUS FOR TRACTORS
Filed Nov. 19, 1951   3 Sheets-Sheet 2
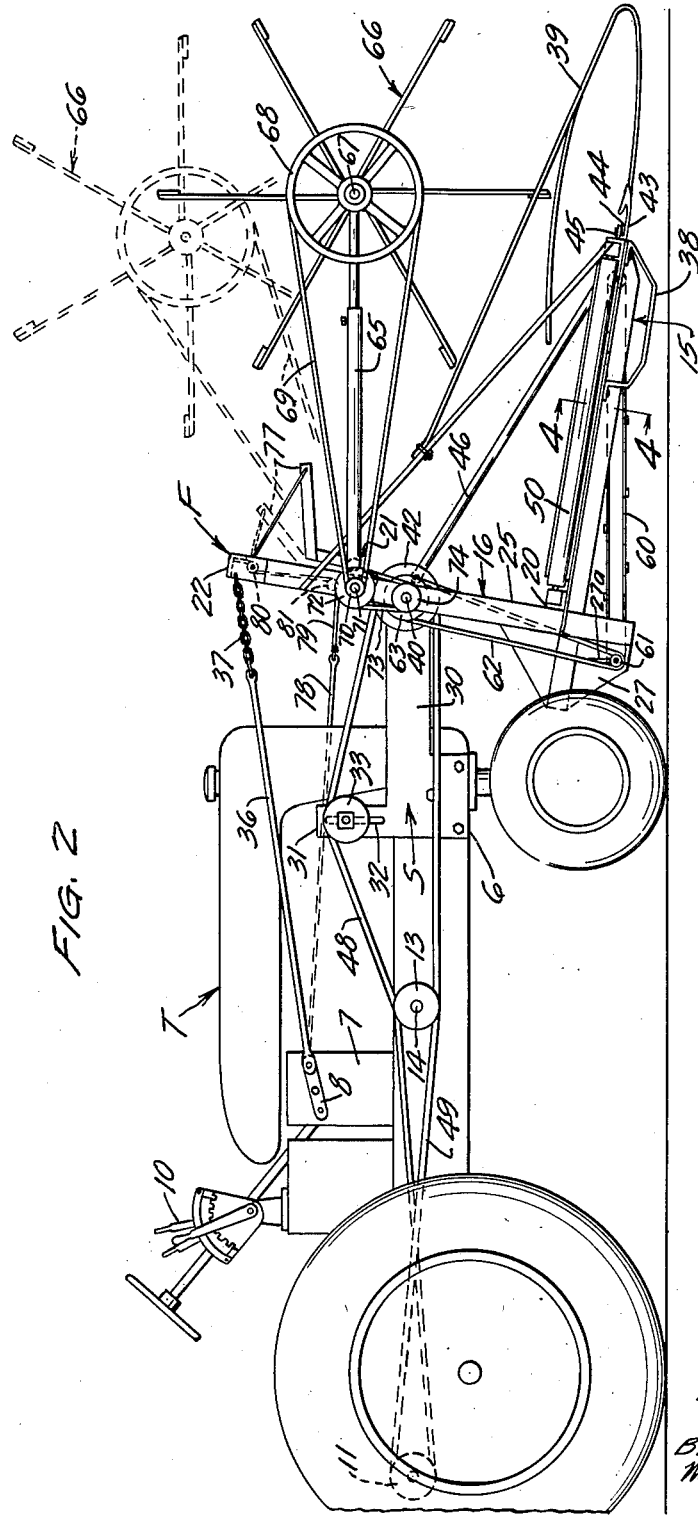
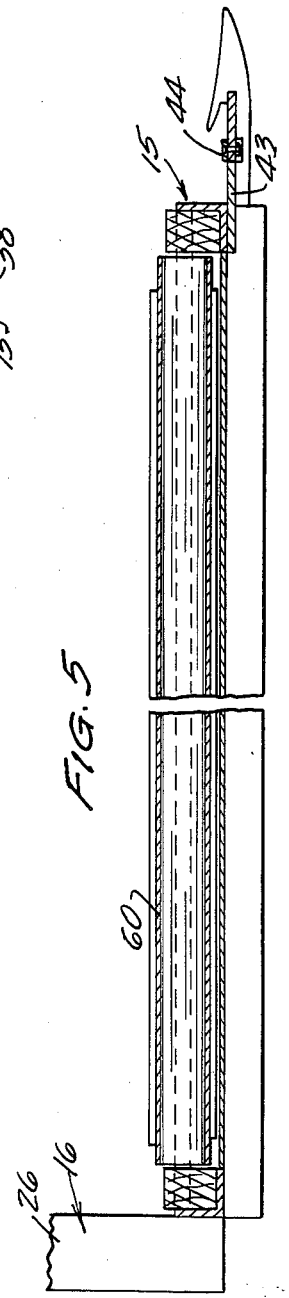
INVENTORS
LEONARD N. VIGUM
ROBERT OSTERUD
BY Williamson & Williamson
ATTORNEYS Feb. 1, 1955     L. N. VIGUM ET AL     2,700,859
GRAIN CUTTING AND WINDROWING APPARATUS FOR TRACTORS
Filed Nov. 19, 1951     3 Sheets-Sheet 3
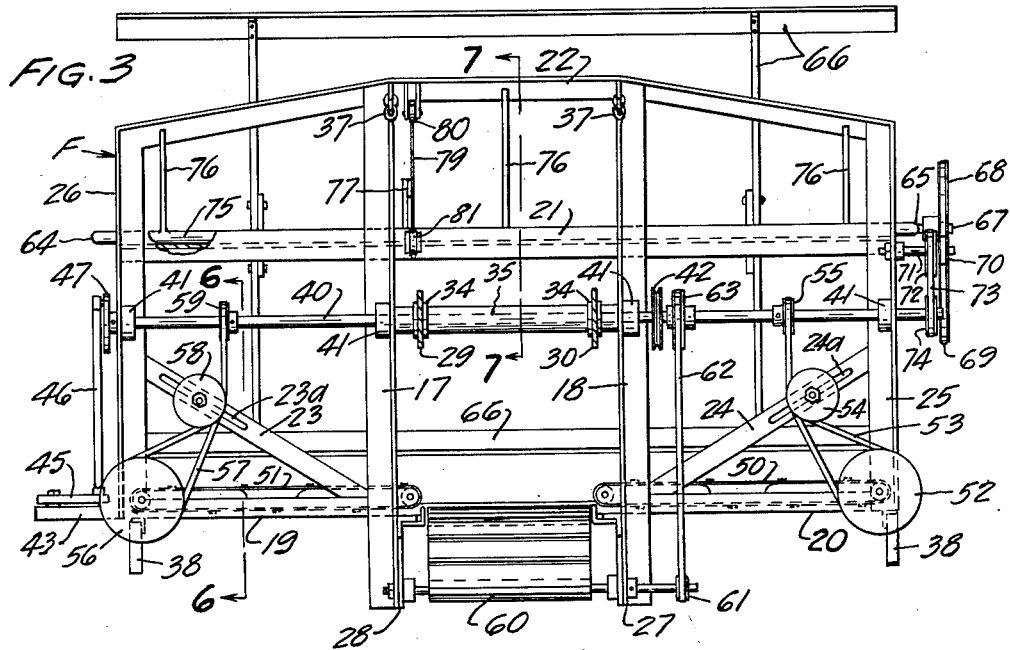
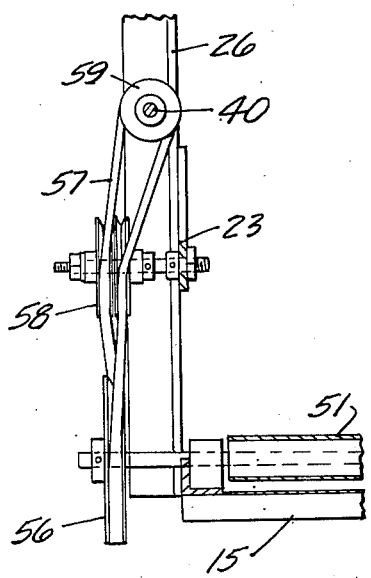
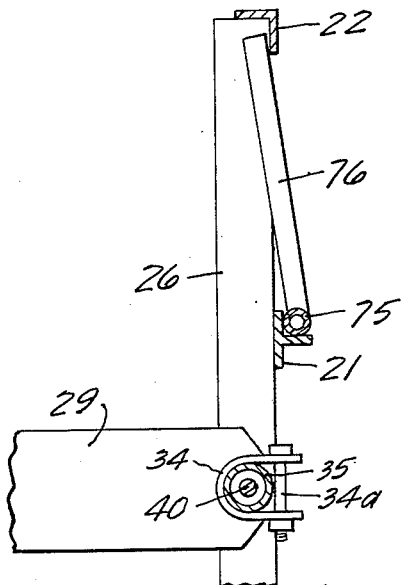
INVENTORS
LEONARD N. VIGUM
ROBERT OSTERUD
BY Williamson & Williamson
ATTORNEYS United States Patent Office 2,700,859
Patented Feb. 1, 1955

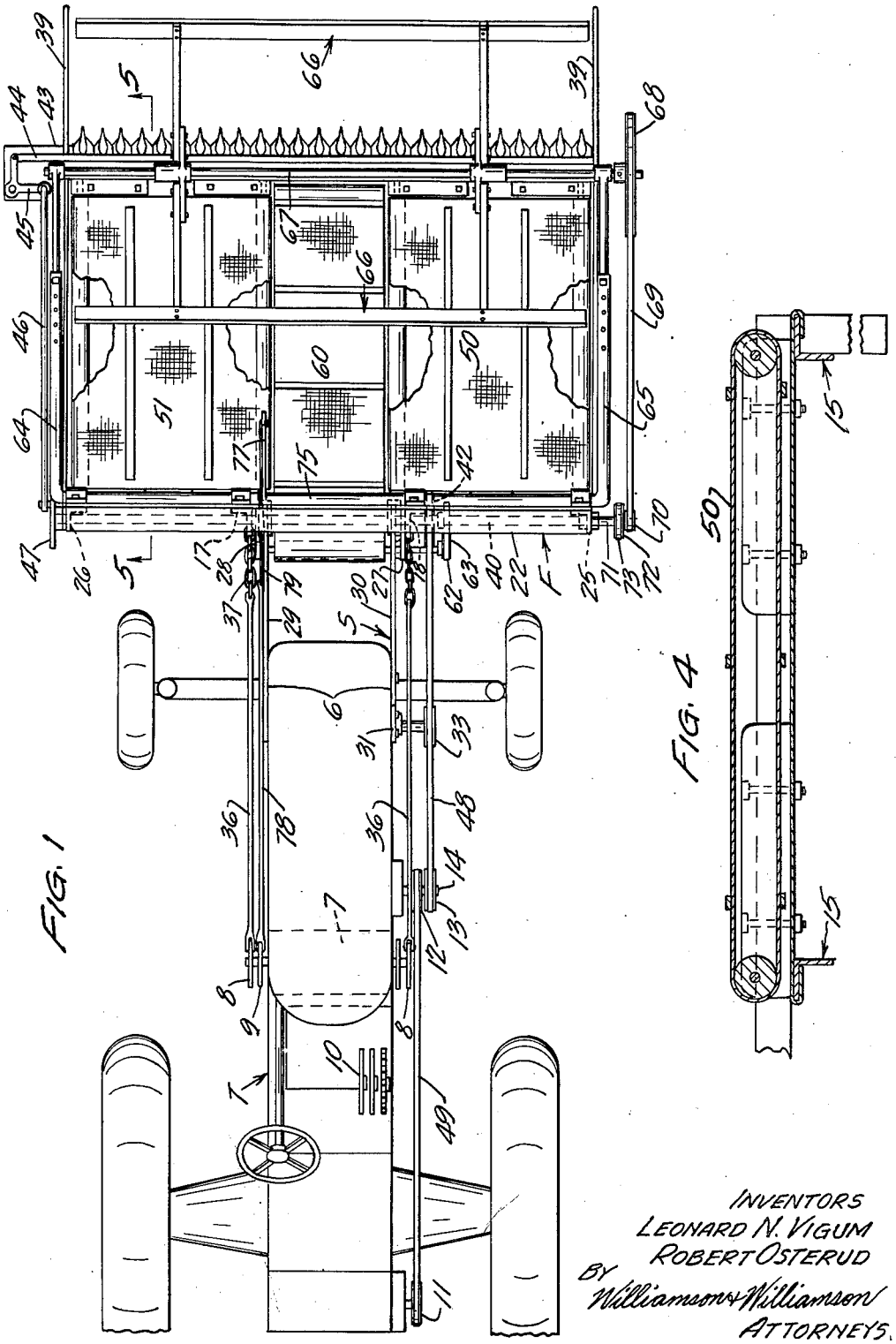

2,700,859

GRAIN CUTTING AND WINDROWING APPARATUS FOR TRACTORS

Leonard N. Vigum and Robert Osterud, Spring Valley, Minn.

Application November 19, 1951, Serial No. 257,082

6 Claims. (Cl. 56—23)

This invention relates to grain cutting and windrowing apparatus for use in conjunction with grain combines. More particularly, it relates to grain cutting and windrowing apparatus for use in conjunction with grain combines, the apparatus being of the type which may be readily attached to or detached from a conventional modern tractor.

The grain cutting and windrowing apparatus in extensive use today wastes a substantial amount of grain in opening up a new field preparatory to cutting the same. This is true because the windrow is normally formed to one side of the apparatus, thus requiring the apparatus to be driven through a swath (known as a back swath) of standing grain equal in width to the apparatus and thus knocking down a substantial portion of that swath. Furthermore, the grain windrow of such apparatus is deposited upon the standing grain and when this standing grain is attempted to be harvested the windrow fouls the machine and plugs the same frequently, thus requiring an excessive amount of time to accomplish the harvesting of the back swath. Since the grain is harvested only when ripe and since the kernels shell easily at that stage of development a very substantial loss in grain results. Some devices which do not place the grain in windrows laterally of the device have been tried but these have been so unsatisfactory because of their complexity, cumbersomeness, weight, cost of manufacture, etc. that they have not proved successful from an operative or commercial standpoint. The cost of manufacturing most of such latter devices has been almost prohibitive.

The need for apparatus which will obviate the losses outlined above has been accentuated with the steady increase in the use of strip farming, since under such farming an area of land which normally would have previously had a single crop thereupon will today have a number of crops planted thereon in strips, and the edges of these crops necessarily meet in order to eliminate excessive waste of land. In such cases, it becomes more imperative to avoid this waste, since the amount of back swathing is increased substantially.

Another problem confronting small grain farmers is the loss of grain caused by a substantial amount of the grain dropping downwardly between the grain stubbles to the ground and thus being missed by the combine during the combining operations and being wasted. This loss is accentuated when the grain is cut parallel to the direction in which the grain was drilled because under such conditions the stubbles tend to spread and the grain tends to sink therebetween. Since all pull-type grain cutting and windrowing apparatus must cut around a given area of grain, the cutting operation is parallel to the direction of drilling a very substantial portion of the time and hence the loss is great. When the cutting operation is normal to the direction of drilling the loss caused by grain slipping downwardly between the rows of stubbles is very substantially less and hence a device which will permit the grain to be cut normally to the direction of drilling is highly desirable.

Even if the grain which slips between the stubble toward the ground is recovered by the combine it is necessarily subjected to rougher treatment in bringing the grain to the surface than if it had laid upon the tops of the stubbles. Because of this rougher treatment a great deal more of the grain kernels are knocked loose and lost. Also, the grain which contacts the ground is moist and the combine cannot do as efficient a threshing job as if the grain had laid upon the tops of the stubble and were dried. Our invention is directed toward the elimination of these disadvantages.

It is a general object of our invention to provide a novel grain cutting and windrowing attachment for any conventional modern tractor, the attachment being of cheap and simple construction and of greatly increased efficiency in accomplishing the cutting and windrowing operation.

A more specific object is to provide a novel grain cutting and windrowing attachment for tractors which may be readily attached to or detached from any modern conventional tractor, which is extremely simple in construction, which can be cheaply manufactured, and which will substantially increase the efficiency of the cutting and windrowing operation.

Another object of our invention is to provide a cheap and simple attachment for a tractor which will eliminate the need for an additional separate piece of large and expensive power-driven machinery for each farm by enabling the farmer to utilize the tractor which he already owns to accomplish the grain cutting and windrowing operations.

Another object is to provide a novel grain cutting and windrowing attachment for a tractor with which either a right or left hand combine may be used.

Another object is to provide a grain cutting and windrowing attachment for a tractor which may easily and readily be attached to or detached from the tractor and which may be very easily controlled by the driver of the tractor without necessitating the driver leaving the seat of the tractor and through the use of the finger-tip controlled hydraulic mechanism of the tractor.

Another object is to save a substantial amount of time by providing a novel grain cutting and windrowing attachment for a tractor which will eliminate the need for a back swath and consequently the need for cutting such a back swath with a windrow deposited therein.

Another object is to provide a grain cutting and windrowing attachment for a tractor which will effect a substantial saving in grain by depositing the grain in windrows upon the grain stubble in an improved manner and direction relative to the direction of the grain stubble to reduce to a minimum the movement of the cut grain downwardly between the grain stubbles.

Another object is to provide a grain cutting and windrowing attachment for a tractor constructed so that the cutting mechanism may be raised or lowered relative to the ground without affecting the elevation of the reel relative to the ground.

Another object of our invention is to provide a novel grain cutting and windrowing attachment for a tractor having a conveyor extending longitudinally of the tractor and depositing the windrows thereunder in an improved manner by gearing the speed of the conveyor to the speed of the tractor.

Still another object is to provide a grain cutting and windrowing attachment for a tractor which is of cheap and simple construction so that each farmer owning a tractor may effect a substantial saving by purchasing such an attachment rather than owning a relatively expensive self-powered grain cutting and windrowing device.

These and other objects and advantages of our invention will more fully appear from the following description made in connection with the accompanying drawings, wherein like reference characters refer to similar parts throughout the several views, and in which:

Fig. 1 is a plan view with parts broken away of one embodiment of our invention mounted upon the forward end of a conventional modern tractor;

Fig. 2 is a side elevational view of the same with one alternate position of the reel shown in broken lines;

Fig. 3 is a rear elevational view with parts broken away and with parts in section of the attachment embodying our invention detached from a tractor;

Fig. 4 is an enlarged sectional view taken along approximately line 4—4 of Fig. 2;

Fig. 5 is an enlarged sectional view taken approximately along line 5—5 of Fig. 1;

Fig. 6 is an enlarged fragmentary sectional view taken approximately along line 6—6 of Fig. 3; and Fig. 7 is an enlarged fragmentary sectional view taken approximately along line 7—7 of Fig. 3.

One embodiment of our invention is shown in Figs. 1 and 2 mounted upon a tractor indicated generally as T, this tractor being of the modern conventional type whereupon the front legs are capable of being mounted either in relatively close relation or, as shown, in considerably spaced relation so that the front wheels are spaced approximately a distance equal to the spacing between the rear wheels. Substantially all of these tractors are provided with attachment plates 6 on each side and adjacent the forward end of the tractor. Most of such tractors have a finger-tip controlled hydraulic mechanism indicated generally as 7 and including a pair of pivot arms 8 pivotally mounted upon the opposite sides of the tractor and connected to the primary mover of the hydraulic mechanism. Also included is a third pivot arm 9 and a plurality of control levers 10, one of which controls the pair of pivot arms 8 and the other of which controls the third pivot arm 9. As shown, these controls are disposed adjacent the steering wheel of the tractor in position so that the operator may readily adjust or regulate the same. Such tractors are also provided with a power take-off pulley 11 and a pair of intermediate pulleys 12 and 13 mounted upon a countershaft 14 which is journaled in one side of the tractor.

One embodiment of our invention may include, as shown in Figs. 1–7, a frame indicated generally as F, this frame being generally right-angular in longitudinal cross sectional shape. The frame shown has a substantially rectangular horizontal forward portion 15 and an upstanding rear portion 16. This upstanding rear portion 16 includes, as best shown in Fig. 3, a central pair of spaced uprights 17 and 18 made, as shown, of angle iron, a pair of bottom cross members 19 and 20, an intermediate cross member 21, and a top cross member 22. Also included is a pair of diagonally extending members 23 and 24 which extend from the lower portion of the uprights 17 and 18 to the medial portion of the outer uprights 25 and 26. Mounted upon the lower portions of the central uprights 17 and 18 and extending rearwardly therefrom is a pair of gusset plates 27 and 28.

The upstanding rear portion 16 of the frame F is provided with support structure indicated generally as S and comprises a pair of rigidly affixed and rearwardly extending support plates 29 and 30. The rearward ends of each of these support plates 29 and 30 are bolted to the attachment plates 6 and one of these support plates is provided with an upwardly extending arm 31 which is provided with a vertical slot 32. Within this slot is mounted an adjustable belt tightener 33.

The forward end portion of each of the support plates 29 and 30 are recessed and have secured in this recess a forwardly opening U-shaped member 34 which is provided with a piercing lock pin 34a through its forward ends. A tubular member 35 extends throughout the U-shaped members 34 and has its end portions rigidly affixed to the uprights 17 and 18 so that the entire frame F may be supported by means of the tubular member 35 extending through the U-shaped members 34 which in turn are supported by the support plates 29 and 30 from the front end of the tractor T.

The pivot arms 8 are connected by a link member 36 and by a cable 37 to the upper end portions of the uprights 17 and 18. Thus, when the pivot arms 8 are caused to pivot by the hydraulic mechanism 7, the link 36 will be drawn rearwardly or thrust forwardly and the frame F will be caused to tilt about the horizontal axis defined by the inner tubular member 35.

The forward end portion 15 of the frame F is provided at each of its sides with a shoe 38 which is adapted to cause the frame F to ride upwardly over the serious obstructions which it might encounter, and to prevent the cutting mechanism, to be hereinafter described, from engaging the ground in the event the front ent of the tractor drops into a hole or ditch. Also provided adjacent the forward end of the horizontal portion 15 on each of its sides is a guard 39 adapted to move through the grain and tend to straighten the same immediately prior to the cutting action.

Mounted upon the upright portion 16 of the frame F and extending transversely thereof is a drive shaft 40. As best shown in Fig. 3, this drive shaft is mounted upon the upper part of the rear portion of the frame and extends transversely to both the tractor and the frame. This drive shaft 40 is rotatably mounted in bearings 41 upon each of the uprights 17, 18 and 25, 26. A power-receiving pulley 42 is carried by the drive shaft 40 adjacent the upright 18 and immediately laterally thereof.

Mounted upon the forward portion 15 of the frame F at its extreme forward end is a sickle bar 43 adapted to receive a sickle 44 which is driven by a reciprocating crank arm 45, the latter of which is in turn driven by a pitman stick 46 pivotally mounted upon a pitman 47. The pitman 47, as best shown in Figs. 1 and 3, is fixedly mounted upon one of the ends of the shaft 40 which extends laterally from the frame F.

The drive shaft 40 is driven by a belt 48 which extends around the drive pulley 42, the tightener pulley 33 and the pulley 13. The pulley 13 is, of course, driven by the pulley 12 which is connected by a belt 49 which extends around the power take-off pulley 11.

Mounted upon the horizontal portion 15 of the frame F in superimposed relation immediately behind the cutting mechanism, which includes the sickle bar 43 and the sickle 44, is a pair of transversely spaced horizontal conveyors 50 and 51. These conveyors, as best shown in Fig. 1, are spaced from each other so as to leave a space therebetween adjacent the medial portion of the frame F and they are driven in a manner so that they will convey toward this central space between the two. As best shown in Fig. 1, they are mounted directly behind the cutting mechanism so as to receive therefrom the grain immediately after it is cut. The conveyor 50 is provided with a drive wheel 52 which is driven by a belt 53. As shown, the belt 53 extends around a pair of belt tighteners 54 which are adjustably mounted in the slot 24a of the diagonal member 24. The belt 53 also extends around a pulley 55 which is fixedly mounted upon the shaft 40 so as to rotate therewith. The conveyor 51 is similarly provided with a drive pulley 56, a belt 57, a pair of belt tighteners 58 and a pulley 59, the latter being mounted upon the shaft 40 for rotation therewith. It will be readily recognized that the belt tighteners 54 and 58 are rotatable in opposite directions and are adapted to receive the belts 53 and 57 therein.

Mounted upon the horizontal portion 15 of the frame F and extending from immediately behind the cutting mechanism rearwardly to the rear portion of the frame is a longitudinally extending conveyor 60. As best seen in Fig. 3, this conveyor is disposed slightly below the lateral conveyors 50 and 51 in position to receive therefrom. This conveyor 60 has its rear end portion adjustably mounted for vertical movement in slots 27a formed in the gussets 27 and 28 so that the elevation of the rear end portion of the conveyor 60 may be adjusted as desired with respect to the height of the grain stubble. As shown, the rear end portion of the conveyor 60 is at optimum position, that is, it is depositing the grain upon the upper ends of the grain stubble without dropping the same thereupon. This conveyor 60 is driven by a pulley 61, a belt 62, and a pulley 63, the latter of which is mounted upon the shaft 40 for rotation therewith. The speed of the conveyor 60 is geared to the forward speed of the tractor so that the conveyor will travel an equal linear distance with respect to the travel of the tractor, thus eliminating the grain from being dragged into the grain stubble while it is being desposited thereupon.

Pivotally mounted upon the upper part of the upstanding rear portion 16 of the frame F at each of its sides is a pair of extensible support arms 64 and 65. These support arms are longitudinally extensible and carry at their forward ends a rotatably mounted reel 66. This reel is mounted upon a transversely extending shaft 67 which is carried by the extreme forward ends of the support arms 64 and 65. Mounted on one end of the shaft 67 is a pulley 68 which is connected by a belt 69 to a much smaller pulley 70 which is mounted upon a countershaft 71 (see Fig. 3). The countershaft 71 also carries a pulley 72 which drives the shaft by means of a belt 73 and a pulley 74 mounted upon the outer end of the shaft 40. In this manner the reel 66 will be caused to rotate by the shaft 40 which also drives the cutting mechanism and each of the conveyors.

The support arms 64 and 65 are connected by a transversely extending shaft 75 at their rear ends, and rigidly affixed to this shaft are three upstanding abutment members 76. As best shown in Fig. 3, these abutment members are of such length that they will abut against the upper cross member 22 when the reel is permitted to lower to its lowest position. Elevation of the reel, however, is accomplished and regulated by means of the pivot arm 9 (see Fig. 1) which is connected to an upstanding lever member 77 by a link 78 and a cable 79. The upstanding lever member 77 is rigidly affixed to the shaft 75 so that when the link 70 is drawn rearwardly the lever arm will be drawn rearwardly also and will cause the shaft 75 to rotate, thereby raising the reel. As best shown in Fig. 3, the cable or chain 79 passes through a sheave 80 connected to the upper cross arm 22 and through a sheave 81 mounted upon the cross member 21.

*Operation*

In operation, the attachment shown is mounted upon the forward end of the tractor in the manner shown. The elevation of the cutting mechanism may be readily adjusted through the use of finger-tip control 10 which will operate the pivot arms 8 to draw the upper cross arm 22 rearwardly or to permit the same to move forwardly, thereby causing the entire frame to swing about the axis defined by the tubular member 35. After the cutting mechanism has been thusly adjusted to its proper elevation, the reel 66 may be similarly adjusted through the use of the other finger-tip controls which activate the link 78. When the link 78 is drawn rearwardly by the pivot arm 9 the reel will be drawn upwardly and vice versa. As the tractor is moved forwardly and the power take-off is thrown into action, the drive pulley 11 will, through the belts 48 and 49, drive the main drive shaft 40 of the attachment. This, it can be readily seen, will cause the pitman stick 46 to reciprocate the crank arm 45. In this manner the sickle 44 is reciprocated rigidly backwardly and forwardly through the sickle bar 43 to cut the grain while the tractor moves forwardly through the field. It will be noted that the attachment cuts a swath at least equal in width to the greatest width of any part of the tractor.

As the grain is cut the reel 66 flings the head portions of the grain rearwardly and causes the individual stalks to be deposited in longitudinally extending direction with respect to the direction of the movement of the tractor upon the conveyors 50, 51 and 60. The portion of the grain which is deposited upon the lateral conveyors 50 and 51 is carried laterally and centrally and deposited gently upon the longitudinally extending conveyor 60. This conveyor 60 carries the grain rearwardly at a linear speed equal to the forward speed of the tractor and deposits the same gently upon the tops of the cut grain stubbles. Since the rear end portion of the conveyor 60 may be adjusted vertically as desired, there will be no appreciable drop of the grain as it is deposited upon the stubble, and since the conveyor is moving at a linear speed equal to that of the forward movement of the tractor, there will be no tendency for the grain to be dragged through the stubble. The central disposition of the longitudinally extending conveyor 60 enables the grain to be deposited in a windrow directly between the wheels of the tractor so that it is not necessary for the grain at any time during the opening of a field to deposit the windrow into standing grain.

It will be noted that the elevation of the cutting mechanism may be adjusted entirely independently of the elevation of the reel 66. All cutting and windrowing mechanisms known to the applicants are constructed so that when the elevation of the cutting mechaisnm is altered the elevation of the reel is also necessarily changed. Thus, it can be seen that in most windrowing mechanisms if the operator desires to change the elevation of the cutting mechainsm so as to cut the grain closer to the surface of the ground or farther away therefrom, and if he is satisfied with the elevation of the reel, he nevertheless must readjust the elevation of the reel if he is to adjust the elevation of the cutting mechanism. This obviously is not true with our attachment since the reel 66 is capable of entirely separate adjustment at substantially all positions. The only time that the reel 66 elevates with the cutting mechanism is when the reel has been permitted to move to its lowest position so that the abutment member 76 abuts against the cross bar 22.

It can be readily seen that we have provided a cheap and simply constructed attachment for all types of modern conventional tractors which will substantially increase the efficiency of the grain cutting and windrowing operation. We have entirely eliminated the existence of a back swath which has up-to-date caused so much waste. At the same time we have provided an attachment which every farmer is capable of owning and which will provide him with a substantial saving as a result of owning such an attachment, since it obviates the need for a relatively large and expensive separate piece of machinery which has its own propelling mechanism. Our attachment can be readily attached or detached from the tractor whenever needed or not needed, and since it is so cheap and simple to construct it involves the outlay of a very small amount of capital. Since the average present day farmer already owns a tractor this attachment provides him with all and even more advantages than he can obtain through the purchase of a separate and much more expensive piece of machinery.

It will be noted that this entire attachment and its operation may be readily controlled by the operator of the tractor without causing the operator to leave the seat of the tractor. By merely adjusting one of the controls 10 he can regulate and control the entire mechanism so that it will perform most efficiently.

One of the salient features of our attachment is the manner in which the grain is deposited upon the tops of the grain stubble. As previously pointed out, it is imperative that the grain be deposited as gently as possible upon the tops of the grain stubble else the grain will slip downwardly between the grain stubble and come in contact with the ground. Once this has happened, the grain becomes moist and even in the event of extremely dry weather, a substantial amount of it is missed by the combine because of its lower elevation. In addition, much of the grain will be threshed out in the process of drawing the grain upwardly through the stubbles. Our attachment deposits the grain gently upon the stubble tops since there is a minimum of drop from the conveyor 60. Since it is possible with our attachment that the grain is always deposited from a level approximately equal to the tops of the grain stubble there is substantially less tendency for the grain to move downwardly between the stubble and thus the grain is presented at a much better position to the combine during the combining operation. In addition, the grain is not dragged forwardly through the grain stubble and thus a minimum of shelling of the kernels is attained.

It should also be noted that the cutting mechanism, the conveying mechanism and the reel are each driven from a single drive shaft on our attachment and that this drive shaft coincides with the axis of rotation about which the frame F swings. It is obvious that we have reduced to an absolute minimum the amount of structure needed to accomplish the cutting and windrowing operation. The simplicity of the device and the minimum of cost of construction is a keynote feature of the device.

It should also be noted that our attachment may be utilized with either a left or a right-hand combine and that no special type of combine is needed for use in conjunction therewith. In addition, it is possible with our attachment to open a new field along any desired line whether diagonal, curved or otherwise without causing any more loss in grain than if opened in the normal manner. This is very important since many times certain portions of a field will ripen much earlier than other portions and also since it is important that grain be cut at a certain angle when the grain has become ripe. With our attachment it is possible to cut an entire field at right angles to the direction along which the grain was drilled into the ground. This means that the grain windrow will be deposited at right angles to the rows of stubble and thus will be less apt to move downwardly therebetween. As a result, the grain is held aloft where it will dry quickly and will present itself in a much better position for the combine to do an efficient combining operation.

Thus, it can be seen that we have provided a cheap and simple attachment for a modern conventional tractor which provides many clear-cut advantages over any such devices previously known. It not only accomplishes the cutting and windrowing operation much more cheaply and efficiently but it also involves the outlay of a minimum amount of capital at the out-set.

It will, of course, be understood that various changes may be made in the form, details, arrangement and proportions of the parts without departing from the scope of our invention.

What we claim is:

1. A grain cutting and windrowing attachment for use upon a tractor having a forward end with wide front wheel-base; said attachment comprising a frame having a cutting mechanism thereon and having a rear and a forward portion, transverse horizontal pivot means connected to said frame and mounting the rear portion of said frame upon the forward end of such a tractor for controlled swinging movement about said pivot, power driven conveyor mechanism mounted upon said frame behind said grain cutting mechanism in position to receive cut grain, said conveyor mechanism being adapted when driven to move the cut grain received from said grain cutting mechanism laterally and centrally with respect to said frame and the tractor, said conveyor mechanism including a pair of conveyors extending transversely of said frame and having inner ends spaced from each other intermediately the width of the frame, said conveyors extending substantially horizontally in their own transverse plane and traveling transversely with respect to the tractor and conveying grain toward the space between their inner ends, and a third conveyor mounted between and below the transverse conveyors and receiving grain from said pair of transverse conveyors and traveling longitudinally of the tractor, the rear end portion of said third conveyor being tilted downwardly and rearwardly relative to said pair of transverse conveyors and being disposed at substantially the same level as the top of the stubble of the grain which is cut to deposit the grain gently upon the tops of the stubble and thereby facilitate the combining of the grain.

2. A grain cutting and windrowing attachment for use upon tractors having a forward end with a wide front wheel-base, a power take-off and hydraulic control mechanism; said attachment comprising a frame having a vertical rear portion and a horizontal forward portion, a single drive shaft rotatably mounted across the vertical rear portion of said frame and extending horizontally and transversely across the entire width thereof, said drive shaft being adapted to be drivably connected with the power take-off of such a tractor, tractor-engaging brackets extending rearwardly from said frame and at front ends rotatably receiving said drive shaft and mounting the frame for tilting movement about the axis of said drive shaft to adjusted positions, grain cutting mechanism mounted upon said frame along the front edge of the horizontal forward portion thereof and extending transversely with respect to the tractor, mechanism connected to said grain cutting mechanism for drivably connecting the same with said drive shaft, power driven conveyor mechanism mounted upon the horizontal forward portion of said frame behind said cutting mechanism in position to receive grain cut thereby and extending from sides of the frames toward the center thereof, said conveyor mechanism being adapted when driven to move the cut grain received from said grain cutting mechanism laterally and centrally with respect to said frame and the tractor, and mechanism connecting said conveyor mechanism with said drive shaft to drive the conveyor mechanism, said frame being adapted to be connected to the hydraulic control mechanism of the tractor for tilting the frame about the drive shaft and thereby controllably adjusting the angle of said frame relative to the ground and relative to the tractor.

3. A grain cutting and windrowing attachment comprising a frame having a forward portion and a rearward portion, a single drive shaft rotatably mounted upon the rearward portion of said frame and extending transversely across substantially the entire width thereof, means for drivably connecting said drive shaft with the power take-off of a tractor, members connected to the rearward portion of said frame for tiltably mounting said frame, said members extending rearwardly from the frame and adapted to be mounted upon the forward end of the tractor, means for controlling tilting movement of the frame in a vertical plane about a transverse horizontal axis, grain cutting mechanism mounted upon said frame along the front edge of the forward portion thereof and extending transversely with respect to said tractor when said frame is so mounted, a rotatable reel swingably mounted upon the rear portion of said frame and disposed in over-hanging relation with respect to said cutting mechanism for readily adjustable and controlled vertical movement of the reel relative to said cutting mechanism and the frame separately therefrom, mechanism drivably connecting said grain cutting mechanism with said drive shaft, mechanism drivably connecting said reel with said drive shaft for rotation of the same, power-driven conveyor mechanism mounted upon said frame transversely thereof behind said grain cutting mechanism in position to receive cut grain therefrom, said conveyor mechanism extending substantially horizontally in its transverse plane, said conveyor mechanism being adapted when driven to move in substantially horizontal orientation the cut grain received from said grain cutting mechanism laterally and centrally with respect to said frame and the tractor, and mechanism connecting said conveyor mechanism with said drive shaft to drive the conveyor mechanism.

4. A grain cutting and windrowing attachment for a tractor having a forward end with a wide front wheel-base and two-tilt hydraulic control mechanism; said attachment comprising a frame having a horizontal forward portion and having a vertical rear portion, the rear portion having a lower and an upper part, support structure connected to the medial rear portion of said frame adapted to swingably and detachably anchor the vertical rear portion of said frame in front of the forward end of a tractor for controlled tilting movement about a horizontal axis extending transversely to and ahead of the tractor when said frame is so anchored and being incapable of vertical movement at its axis of pivot relative to the tractor, grain cutting mechanism mounted upon said frame along the front edge of the forward portion thereof and extending transversely with respect to the tractor, mechanism connected to said grain cutting mechanism and adapted for connecting the same with a source of power to drive the same, said frame being adapted to have the upper part of its rear portion connected to one lift of the hydraulic mechanism of the tractor to cause the frame to tilt about such horizontal axis and to thereby controllably raise or lower said grain cutting mechanism, a rotatable reel tiltably mounted for vertical movement upon the upper part of the rear portion of said frame and extending forwardly therefrom, said reel being adapted to be connected to the other lift of the hydraulic control mechanism of the tractor whereby said reel may be readily raised or lowered at will relative to and independent of adjustment of the frame, conveyor mechanism mounted upon the forward portion of said frame behind said grain cutting mechanism in position to receive grain therefrom and extending substantially horizontally in its transverse plane, and mechanism connected to said conveyor mechanism for drivably connecting the same with a source of power to drive the same, said conveyor mechanism being adapted when driven to move the cut grain received from said grain cutting mechanism laterally and centrally with respect to said frame and the tractor into windrows and to deposit the grain upon the tops of the grain stubble.

5. A grain cutting and windrowing attachment for a tractor having a wide front wheel-base and a power take-off and finger-tip controlled hydraulic mechanism; said attachment comprising a frame having a horizontal forward portion and having a vertical rearward portion, the rear portion having a lower part and an upper part, a drive shaft rotatably mounted upon the vertical rearward portion of said frame and extending transversely thereof with respect to the direction of movement of the tractor, said drive shaft being adapted to be drivably connected to the power take-off of the tractor, support structure having one of its ends firmly but detachably securable to the tractor and its other end pivotally supporting said frame by its rearward portion, said frame being tiltable about a horizontal axis coinciding with the axis of said drive shaft, the rear portion of said frame being incapable of movement relative to the tractor other than such tilting movement about such horizontal axis and being adapted to be connected to the hydraulic mechanism of the tractor to be controllably tilted thereby, grain cutting mechanism mounted upon said frame along the front edge of the forward portion thereof and extending transversely with respect to the frame and the tractor, mechanism drivably connecting said grain cutting mechanism with said drive shaft, power-driven conveyor mechanism mounted upon the forward portion of said frame transversely thereof behind said grain cutting mechanism in position to reecive cut grain therefrom and extending substantially horizontally in its own transverse plane, said conveyor mechanism being adapted when driven to move the cut grain received from said grain cutting mechanism toward the transverse center of said frame and into windrows, and mechanism connecting said conveyor mechanism with said drive shaft to drive the same, said conveyor mechanism including a pair of spaced conveyors traveling transversely with respect to the tractor from opposite sides thereof and conveying toward space between their inner ends and a third substantially horizontal conveyor mounted between and receiving grain from said pair of conveyors and traveling longitudinally of the frame and carrying the grain rearwardly and having a rear end portion, the rear end portion of said third conveyor being inclined rearwardly and downwardly relative to said pair of conveyors and being disposed slightly above the level of the top of the stubble of the grain which is cut to thereby deposit the grain gently in a reclining position upon the tops of the stubble without the grain becoming tangled with the stubble and thereby facilitate the combining of the grain.

6. A grain cutting and windrowing attachment for a tractor having a wide front wheel-base and finger-tip controlled hydraulic mechanism and a power take-off, said attachment comprising in combination a frame having a forward portion and having a rearward portion including a lower part and an upper part, a drive shaft rotatably mounted upon the medial rear portion of said frame and extending horizontally across the frame transversely with respect to the tractor, means for transmitting rotary motion to said drive shaft from the power take-off of such a tractor, support structure having end portions, one of which is adapted to be firmly but detachably secured to the front end of the tractor and the other of which pivotally supports said frame for tilting movements about a horizontal axis coinciding with the axis of said drive shaft, the rearward portion of said frame being held incapable of movement other than said tilting movement by said support structure and being adapted to be connected to the hydraulic mechanism of the tractor and controllably tilted thereby, grain cutting mechanism mounted upon the forward portion of said frame and extending transversely with respect to the tractor, mechanism drivably connecting said grain cutting mechanism with said drive shaft to drive the grain cutting mechanism, a vertically movable and rotatable reel pivotally supported from the upper part of the rear portion of said frame and extending forwardly therefrom, said reel being adapted to be connected to the hydraulic control mechanism of the tractor whereby said reel may be raised or lowered at will and held in a vertically adjusted position, mechanism drivably connecting said reel with said drive shaft to rotate the reel, power-driven conveyor mechanism mounted upon said frame behind said grain cutting mechanism in position to receive cut grain therefrom, said conveyor mechanism extending transversely of the frame and serving to move the cut grain received from said grain cutting mechanism laterally and centrally with respect to said frame and the tractor and into windrows, mechanism connecting said conveyor mechanism with said drive shaft to drive the conveyor mechanism, said conveyor mechanism including a pair of conveyors disposed in spaced end to end relation to each other and traveling transversely with respect to the tractor in a substantially horizontal plane and conveying grain toward the space between the inner ends of the conveyor and a third conveyor mounted between and receiving grain from said pair of conveyors and traveling longitudinally of the tractor in a substantially horizontal transverse plane and serving to carry the grain rearwardly and having a rear end portion, the rear end portion of said third conveyor being inclined rearwardly and downwardly relative to said pair of conveyors and having its rear end disposed at substantially the same level as the top of the stubble of the grain which is cut and thereby deposit the grain gently upon the tops of the stubble and facilitate the combining of the grain.

References Cited in the file of this patent

UNITED STATES PATENTS

| | | |
|---|---|---|
| 796,268 | Troeger | Aug. 1, 1905 |
| 1,271,845 | Bryant | July 9, 1918 |
| 1,309,689 | Jory | July 15, 1919 |
| 1,906,498 | Templeton | May 2, 1933 |
| 1,911,637 | Metcalf | May 30, 1933 |
| 1,938,263 | Templeton | Dec. 5, 1933 |
| 2,410,918 | Acton | Nov. 12, 1946 |
| 2,487,144 | Kriedeman | Nov. 8, 1949 |
| 2,510,245 | Munter | June 6, 1950 |